United States Patent
Fujita et al.

(10) Patent No.: US 8,128,238 B2
(45) Date of Patent: Mar. 6, 2012

(54) PROJECTION OPTICAL SYSTEM AND IMAGE DISPLAYING APPARATUS

(75) Inventors: Kazuhiro Fujita, Tokyo (JP); Atsushi Takaura, Tokyo (JP); Issei Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 478 days.

(21) Appl. No.: 12/203,534

(22) Filed: Sep. 3, 2008

(65) Prior Publication Data

US 2009/0066919 A1    Mar. 12, 2009

(30) Foreign Application Priority Data

Sep. 7, 2007  (JP) ................................. 2007-233249
Jun. 18, 2008  (JP) ................................. 2008-159655

(51) Int. Cl.
    *G03B 21/28* (2006.01)
(52) U.S. Cl. ............... 353/98; 353/30; 353/31; 353/37; 353/74; 353/77; 353/79; 353/99; 353/119; 353/122; 359/649; 359/650; 359/651; 359/726; 359/727
(58) Field of Classification Search .............. 353/99, 353/37, 74, 77, 78, 79, 98; 359/448, 649–651, 359/726–736, 813, 823, 846, 850; 348/E9.027, 348/E5.138, 755, 756, 771
    See application file for complete search history.

(56) References Cited

U.S. PATENT DOCUMENTS

| 6,808,271 | B1* | 10/2004 | Kurematsu ..................... 353/70 |
| 6,994,437 | B2* | 2/2006 | Suzuki et al. .................. 353/77 |
| 7,021,770 | B2* | 4/2006 | Konno et al. ................... 353/78 |
| 7,048,388 | B2* | 5/2006 | Takaura et al. ................ 353/99 |
| 7,411,737 | B2* | 8/2008 | Imaoka et al. ................ 359/649 |
| 7,503,661 | B2* | 3/2009 | Masubuchi et al. ............ 353/99 |
| 7,553,031 | B2* | 6/2009 | Hisada et al. .................. 353/70 |
| 2003/0206353 | A1* | 11/2003 | Ishihara ........................ 359/726 |
| 2004/0196568 | A1* | 10/2004 | Matsuo ......................... 359/649 |
| 2004/0233405 | A1* | 11/2004 | Kato et al. ...................... 355/53 |
| 2005/0041220 | A1* | 2/2005 | Sunaga .......................... 353/99 |
| 2007/0146647 | A1* | 6/2007 | Sarayeddine et al. .......... 353/77 |
| 2008/0192208 | A1* | 8/2008 | Benoit et al. .................. 353/85 |

FOREIGN PATENT DOCUMENTS

| DE | 199 51 306 A1 | 4/2001 |
| DE | 10 2005 027 389 A1 | 11/2006 |
| EP | 1 139 145 A2 | 10/2001 |
| EP | 1 806 612 A1 | 7/2007 |
| EP | 2 026 128 A1 | 2/2009 |
| JP | 2001-255462 | 9/2001 |
| JP | 2004-258620 | 9/2004 |
| JP | 2004-309765 | 11/2004 |
| JP | 2006-235516 | 9/2006 |
| JP | 2007-212748 | 8/2007 |
| WO | WO 01/31397 A1 | 5/2001 |
| WO | WO 2006/117044 A1 | 11/2006 |

* cited by examiner

*Primary Examiner* — Georgia Y Epps
*Assistant Examiner* — Sultan Chowdhury
(74) *Attorney, Agent, or Firm* — Dickstein Shapiro LLP

(57) ABSTRACT

Disclosed is a projection optical system including a projection surface configured such that an image conjugate to an object is projected, plural optical elements having a refractive power, and a deflecting element having no refractive power configured to deflect an optical path of a light beam and to pass the light beam having a deflected optical path between the plural optical elements, wherein a normal line of the projection surface at a center of the projection surface does not pass through the plural optical elements or between the plural optical elements.

6 Claims, 8 Drawing Sheets

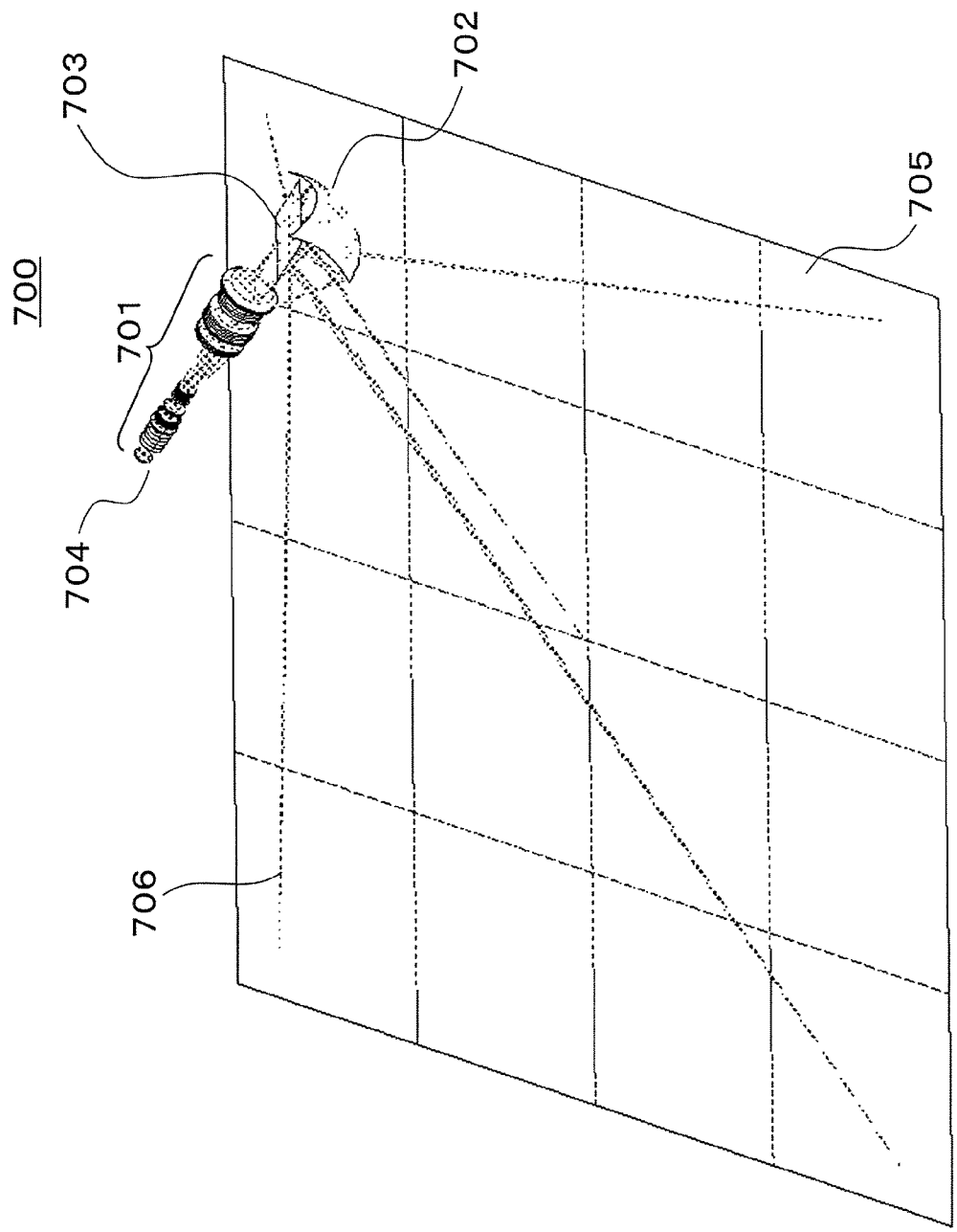

PROJECTION OPTICAL SYSTEM AND IMAGE DISPLAYING APPARATUS

BACKGROUND OF THE INVENTION

1. Field of the Invention

The present invention relates to a projection optical system and an image displaying apparatus.

2. Description of the Related Art

Various techniques for a projection optical system and an image displaying apparatus have been disclosed conventionally.

For example, Japanese Patent Application Publication No. 2001-255462 (JP-A-2001-255462) discloses a projection optical system for light-guiding a light beam from an image displaying panel onto a screen tilted with respect to a reference axis to form an image information on the screen, wherein the projection optical system includes a reflection optical system having plural rotationally asymmetric reflective surfaces having a curvature and reflecting from the plural rotationally asymmetric reflective surfaces a light beam from the image displaying panel to guide light onto the screen and a stop provided between the plural rotationally asymmetric reflective surfaces of the reflection optical system or between the reflection optical system and the image displaying panel, wherein the stop is arranged to be imaged with a negative magnification by an optical member arranged at the screen side of the position of the stop, and the like.

In particular, a projection optical system including six free-form surface mirrors thereby conducting upward reflections from the downside to the upside in order, then forming an intermediate image, then conducting reflection on a concave mirror, and finally conducting projection on a screen by means of oblique incidence is disclosed in FIG. 1 of JP-A-2001-255462.

However, the projection optical system as disclosed in FIG. 1 of JP-A-2001-255462 may have a problem that the height of the apparatus is large because its optical path is folded by the mirrors provided in the vertical directions.

Meanwhile, Japanese Patent Application Publication No. 2006-235516 (JP-A-2006-235516) discloses a projection optical system for enlarging an image on a conjugate plane at the reduction side among a pair of conjugate planes and imaging it on a conjugate plane at the enlargement side, wherein a first imaging system and a second imaging system are arranged in order from the conjugate plane side at the reduction side, wherein the first imaging system includes plural lenses and the second imaging system includes a concave reflecting mirror having an aspherical form, and the optical system is configured to form an intermediate image at a position between the first imaging system and the second imaging system, and the like.

In particular, a projection optical system for forming an intermediate image by a refraction system, then conducting reflection on a concave mirror, and finally conducting projection onto a screen by means of oblique incidence is disclosed in FIG. 1 of JP-2006-235516.

However, the projection optical system as disclosed in FIG. 1 of JP-A-2006-235516 may have a problem that the height of the apparatus is large because the concave mirror has a downward-projecting part although it has no part projecting to the projection display side (above the lens in FIG. 1).

Meanwhile, Japanese Patent Application Publication No. 2004-309765 (JP-A-2004-309765) discloses a reflection and imaging optical system including plural optically reflective surfaces having a curvature, wherein the gap between a pair of optically reflective surfaces through which an entering light beam passes at the time of entering the reflection optical system is identical to the gap between a pair of optically reflective surfaces through which an exiting light beam passes at the time of exiting, and the like.

In particular, an optical system obtaining an intermediate image by a refraction system and a mirror system and conducting enlargement and projection by a concave mirror is disclosed in FIG. 2 of JP-A-2004-309765. More specifically, a projected image is obtained by four optically reflective surfaces (described as rotationally asymmetric surfaces having a curvature in paragraph [0027] of JP-A-2004-309765) whereby the optical path crosses plural times in the inside of the reflection optical system after exiting from the refraction system. Also, an optical system with three surfaces is disclosed in FIG. 5 of JP-A-2004-309765. A reflective surface of the optical system disclosed in each of FIG. 2 and FIG. 5 of JP-A-2004-309765 is an optically reflective surface having a power and has a desired shape based on the design of a projection optical system.

However, the reflection optical system in the optical system as disclosed in each of FIG. 2 and FIG. 5 of JP-A-2004-309765 has a projecting part to a side (upside) opposite to the projection side (downside) so that the apparatus has a projecting bottom and accordingly is large.

Furthermore, because the last surface of the imaging optical system has a power in the optical system as disclosed in each of FIG. 2 and FIG. 5 of JP-A-2004-309765, it has to be arranged in accordance with a desired design value of its position with respect to another optically reflective surface. Herein, it may be possible to control the direction of projection by tilting or moving an optical element but movement of an optical element having a power could cause degradation of the optical performance of projection. That is, it would be very difficult to maintain the projection performance. If a desired angle was intended to set, it would be necessary to re-design the entire optical system. If the optically reflective surface which is the last surface was replaced with a plane mirror that substantially has no power and the shape of another optical element was optimized and designed again in order to ensure the projection performance, the sizes of the optical system such as the height of the entire optical system and the distance between the projection position at the maximum height and the bottom surface of the optical system would not be reduce.

Meanwhile, optical systems installed in a rear projector and including a first optical system and a second optical system are disclosed in FIG. 1 and FIG. 2 of Japanese Patent Application Publication No. 2007-212748 (JP-A-2007-212748).

In particular, a configuration such that light rays reflected from a concave mirror constituting the second optical system are reflected by a folding mirror, traverse a light beam passing between the first optical system and the second optical system, and projected onto a screen is disclosed in FIG. 2 of JP-A-2007-212748. The first optical system and a first reflective surface (for example, a concave mirror in FIG. 2) of the second optical system are arranged to put the normal line of an image plane (for example, a screen) at the center thereof between them. That is, the first optical system is arranged apart from the second optical system while the normal line of an image plane (for example, a screen) at the center thereof is centered.

Such a configuration results in a projection optical system that is larger than the longitudinal dimension of a projected image reflected on a screen. Furthermore, if the positional relationship between the first optical system and the second optical system is not held at a desired positional relationship, the imaging performance may be degraded. That is, there is a problem that it could be an impractical projection system, because a member for holding a concave mirror while its positional relationship with the first optical system is held is large, particularly in the case of its application to a front projector. Moreover, even if reduction of its thickness may be attained in its application to rear projection, there is a problem that the size of projection apparatus is increased, because the first optical system is separated from the second optical system, and accordingly, the space occupied by light traveling in the inside of the optical system is large.

The inventors have conceived of an idea of providing a more compact projection optical system.

The inventors have also conceived of an idea of providing an image displaying apparatus comprising a more compact projection optical system.

SUMMARY OF THE INVENTION

According to one aspect of the present invention, there is provided a projection optical system comprising a projection surface configured such that an image conjugate to an object is projected, plural optical elements having a refractive power, and a deflecting element having no refractive power configured to deflect an optical path of a light beam and to pass the light beam having a deflected optical path between the plural optical elements, wherein a normal line of the projection surface at a center of the projection surface does not pass through the plural optical elements or between the plural optical elements.

According to another aspect of the present invention, there is provided an image displaying apparatus comprising an image generating device configured to generate an image and an image projecting and displaying device configured to project and display an image generated by the image generating device onto or on a display surface, wherein the image projecting and displaying device comprises the projection optical system as described above.

BRIEF DESCRIPTION OF THE DRAWINGS

FIG. 7 is a diagram illustrating the configuration of a projection optical apparatus of practical example 5 according to an embodiment of the present invention.

DETAILED DESCRIPTION OF THE PREFERRED EMBODIMENTS

Figure 1A:
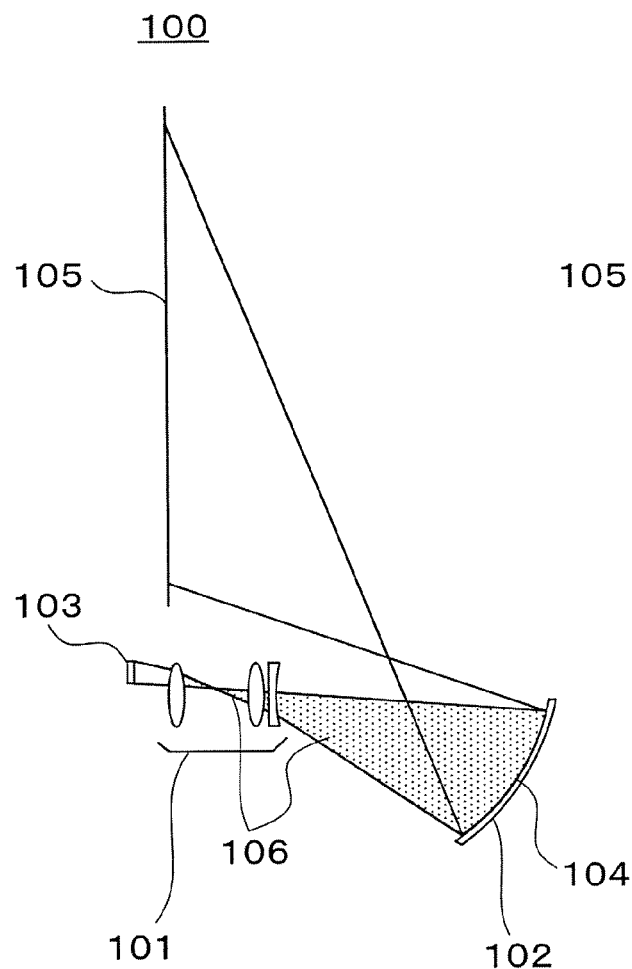
FIG. 1A and FIG. 1B are diagrams illustrating an imaging light beam and a projection light beam in a projection optical apparatus that is a more specific example of an embodiment of the present invention.

Next, some embodiments of the present invention will be described with reference to the drawings.

A first embodiment of the present invention is a projection optical system including plural optical elements having a refractive power and projecting an image conjugate to an object onto a projection surface, wherein the projection optical system includes a deflecting element provided such that the optical path of a light beam is deflected and a light beam whose optical path is deflected passes between the plural optical elements and having no refractive power, and the normal line of the projection surface at the center of the projection surface does not pass through the plural optical elements or between the plural optical elements.

Herein, having a refractive power (a power) means to have a positive refractive power or negative refractive power for each of the plural optical elements. Furthermore, each of the plural optical elements is not particularly limited, and may be, for example, an optical element transmitting light such as a lens or may be, for example, an optical element reflecting light such as a mirror. Moreover, the projection surface is not particularly limited if it is a surface onto which an image conjugate to an object is projected, and may be a planar surface or a curved surface and may or may not be included in the projection optical system.

Because the normal line of the projection surface at the center of the projection surface does not pass through the plural optical elements or between the plural optical elements, it may be expressed as the normal line of the projection surface at the center of the projection surface not traversing any of optical elements constituting the projection optical system and not passing between the optical elements. That is, a configuration is provided such that the normal line of the projection surface at the center of the projection surface does not traverse the projection optical system.

Furthermore, when the normal line of the projection surface at the center of the projection surface does not pass through the plural optical elements or between the plural optical elements, there exists an observation position and a projected image displayed on the projection surface is viewed from the arranged projection optical system side, there exists a viewing position at which the projected image is not covered by the projection optical system itself.

In addition, the center of the projection surface means a point at which the sum of vectors from the center of the projection surface to arbitrary points on the projection surface is completely or substantially zero.

Furthermore, when the normal line of the projection surface at the center of the projection surface does not pass through the plural optical elements or between the plural optical elements, the normal line of the projection surface at a point of incidence of the principal ray of a light beam may not pass through the plural optical elements or between the plural optical elements. In addition, the principal ray of a light beam means a light ray passing through the center of an aperture stop that is allowed to provide for the projection optical system.

Furthermore, the light beam whose optical path is deflected passing between the plural optical elements means that the light beam whose optical path is deflected by the deflecting element passes through the space between the tangential plane of a first optical system at the intersection point of the surface of the first optical element with the optical axis of the first optical element and the tangential plane of a second optical element closest to the first optical element at the intersection point of the surface of the second optical element at the first optical element side with the optical axis of the second optical element.

Moreover, the deflecting element having no refractive power may include a deflecting element whose refractive power is completely zero or a deflecting element whose refractive power is regarded as being substantially zero. For the deflecting element whose refractive power is regarded as being substantially zero, there is provided, for example, a deflecting element in which the design value of its refractive power is zero and it has an error in the refractive power which error is caused by a production error.

Specifically, it is a surface that does not contribute to the optical design of the projection optical system and refers to, for example, a plane mirror or a parallel plate. A parallel plate may affect the imaging performance depending on its thickness but corresponds to an element having no power. Usually, a parallel plate may have a radius of curvature of several mm for a bad case through several thousand mm for a good case depending on the tolerance of production errors. Exactly, it has thus a curvature but it is expressed to have no refractive power if the imaging performance is not affected.

The deflecting element is not particularly limited if it is an element provided such that a light beam whose optical path is deflected and a light beam whose optical path is deflected passes between the plural optical elements and having no refractive power, and for example, there are provided the plane mirror as described above and another mirror such as a Fresnel-type mirror. Furthermore, the deflecting mirror may be an element detachable from the projection optical system. Its reflectance may be controlled in order to control the amount of reflected light. A configuration for separating projected light, such as a half mirror structure, may be included in the scope of the embodiment of the present invention.

According to the first embodiment of the present invention, it may be possible to provide a more compact projection optical system.

A second embodiment of the present invention is the projection optical system according to the first embodiment of the present invention, wherein the deflecting element is provided such that the light beam whose optical path is deflected has overlap with a light beam passing through the plural optical elements.

Herein, the light beam whose optical path is deflected having overlap with a light beam passing through the plural optical elements means that at least a part of the light beam whose optical path is deflected by the deflecting element traverses (overlaps with and passing through) a light beam passing through the plural optical elements.

According to the second embodiment of the present invention, it may be possible to provide a more compact projection optical system.

For a more specific example of the first or second embodiment of the present invention, there is provided a projection optical apparatus which is composed of a projection optical system including plural optical elements having a power and a deflecting element having no power substantially and arranged in the projection optical path from the projection optical system to a projected image, wherein the optical path of a projection light beam exiting from the projection optical system is deflected by the deflecting element and then it transverses an imaging light beam passing through the optical elements having a power.

Herein, the projection light beam is a projection light beam exiting from the projection optical system, that is, a beam of light rays exiting from the last surface having a power in the projection optical system including the plural optical elements having a power. Also, the imaging light beam is an imaging light beam passing through the optical elements, that is, a light beam passing in the optical path from the first surface having a power to the last surface having a power in the projection optical system.

In regard to the projection optical apparatus, it may be possible to prevent the size of the projection optical apparatus from increasing and to obtain a compact optical system. More particularly, because the projection light traverses a light beam in the projection optical system due to the deflecting element, it may be possible to utilize the occupied space efficiently and to attain slimming of the projection system. Furthermore, in regard to a rear projection optical system, it may be possible to realize a compact apparatus. Moreover, it may be possible to solve the problem that the height of a projection optical system is greater than the size of a screen and accordingly the space occupied by the projection system is increased, in the conventional art as disclosed in FIG. 2 of JP-A-2007-212748. Furthermore, in regard to a front projector, it may be possible to realize a compact projection apparatus and to reduce its projection space.

Figure 1B:
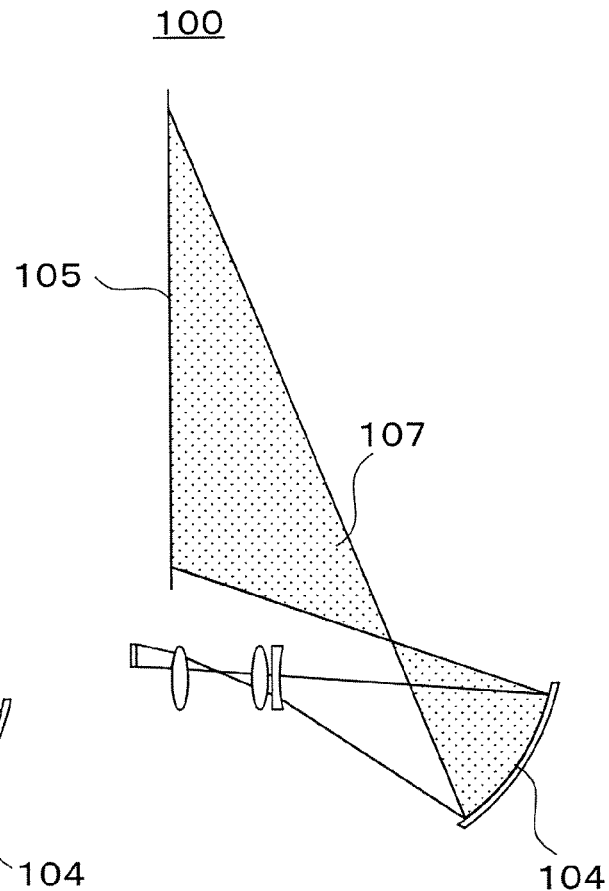

FIG. 1A and FIG. 1B are diagrams illustrating an imaging light beam and a projection light beam in a projection optical apparatus that is a more specific example of the embodiments of the present invention. FIG. 1A is a diagram illustrating the imaging light beam and FIG. 1B is a diagram illustrating the projection light beam.

In FIG. 1A and FIG. 1B, a projection optical apparatus 100 includes a first optical system 101 and a second optical system 102. However, a deflecting element included in the projection optical apparatus that is a more specific example of the embodiments of the present invention is not shown in FIG. 1A or FIG. 1B. In the projection optical apparatus 100, a light beam of light exiting from an object 103 passes through the first optical system 101 and is reflected by the last surface 104 having a power in the second optical system 102 so that a projected image 105 is formed in case of no deflecting element. Herein, an imaging light beam 106 is a light beam passing through optical elements from the first surface having a power in the first optical system 101 to the last surface 104 having a power in the second optical system 102, as shown in FIG. 1A, and a projection light beam 107 is a light beam exiting from the last surface 104 having a power in the second optical system 102, as shown in FIG. 1B. Additionally, if an object is provided at the enlargement side, an image plane is provided at the reduction side, and the projection light beam refers to a light beam from the object 103 to the first optical system 101 in FIG. 1A and FIG. 1B.

A third embodiment of the present invention is the projection optical system according to the first or second embodiment of the present invention, wherein the plural optical elements include a first optical system having a positive refractive power and forming an intermediate image conjugate to the object and a second optical system including at least one optical element and forming an image conjugate to the intermediate image.

Herein, the image conjugate to the intermediate image may be identical to or different from an image conjugate to an object in the first or second embodiment of the present invention.

According to the third embodiment of the present invention, it may be possible to provide a more compact projection optical system including a more compact deflecting element.

For a more specific example of the third embodiment of the present invention, there is provided a projection optical apparatus wherein the projection optical system that is a more specific example of the first or second embodiment of the present invention is composed of a first optical system having a positive power and a second optical element so that an intermediate image is formed by the first optical system and then re-imaging is conducted by the second optical system.

In the projection optical apparatus, it may be possible to miniaturize the deflecting element in order to reduce the size of the apparatus. More specifically, it may be possible to obtain an optical system that is allowed to bundle projection light rays emanating from the projection optical system. More particularly, because an optical system forming an intermediate image is used, a location at which light rays are condensed, which location may correspond to a so-called "stop", is provided in the second optical system, and then, the deflecting element is arranged near here, whereby it may be possible to reduce the size of the deflecting element. Also, it may be possible to reduce the size of the projection optical apparatus.

A fourth embodiment of the present invention is the projection optical system according to the third embodiment of the present invention, wherein the at least one optical element includes a reflective optical element having a positive refractive power.

Herein, the reflective optical element is not particularly limited if it is an optical element reflecting light and having a positive refractive power, and for example, spherical concave mirrors and aspherical concave mirrors are provided. In addition, for aspherical surfaces, for example, rotationally symmetric aspherical surfaces and rotationally asymmetric aspherical surfaces such as anamorphic aspherical surfaces and free-form surfaces are provided.

According to the fourth embodiment of the present invention, it may be possible to provide a more compact projection optical system including a more compact deflecting element.

For a more specific example of the fourth embodiment of the present invention, there is provided the projection optical apparatus that is a more specific example of the third embodiment of the present invention, wherein the second optical system is composed of at least a reflecting mirror having a positive power.

In the projection optical apparatus; it may be possible to miniaturize the deflecting element in order to reduce the size of the apparatus. More specifically, it may be possible to obtain an optical system that is allowed to bundle light rays emanating from the projection optical system. More particularly, because an optical system forming an intermediate image is used, a location at which light rays are condensed, which location may correspond to a so-called "stop", is provided in the second optical system, and then, the deflecting element is arranged near here, whereby it may be possible to reduce the size of the deflecting element. Also, it may be possible to reduce the size of the projection optical apparatus.

A fifth embodiment of the present invention is the projection optical system according to the fourth embodiment of the present invention, wherein the reflective optical element is an optical element provided to be closest to an image conjugate to the intermediate image in the at least one optical element.

According to the fifth embodiment of the present invention, it may be possible to provide a more compact projection optical system in which the angle of the optical path of light reflected from the reflective optical element to the deflecting element with respect to the optical path of light incident on the reflective optical element is further reduced.

For a more specific example of the fifth embodiment of the present invention, there is provided the projection optical apparatus that is a more specific example of the fourth embodiment of the present invention, wherein a reflecting mirror having a positive power is arranged at the last surface of the second optical system at the projected image side.

In the projection optical apparatus, the second optical system has a function of reflection, whereby it may be possible to increase a deflection angle, to facilitate guiding to the deflecting element, and to realize a more compact optical system. More particularly, because an optical system forming an intermediate image is used, a location at which light rays are condensed, which location may correspond to a so-called "stop", is provided in the second optical system, and then, the deflecting element is arranged near here, whereby it may be possible to reduce the size of the deflecting element. Also, it may be possible to reduce the size of the projection optical apparatus. Particularly, when the second optical system is composed of a reflecting mirror, it may be possible to fold the optical path for folding the apparatus and further it may be possible to utilize the space for the optical path of projection more efficiently due to the deflecting element.

A sixth embodiment of the present invention is the projection optical system according to the fourth or fifth embodiment of the present invention, wherein the deflecting element is provided such that the light beam whose optical path is deflected passes between the first optical system and the reflective optical element.

Herein, the light beam whose optical path is deflected passing between the first optical system and the reflective optical element means that the light beam whose optical path is deflected by the deflecting element passes through the space between the tangential plane of a first optical system closest to the reflective optical element in the first optical system at the intersection point of the surface of the first optical element with the optical axis of the first optical element and the tangential plane of the reflective optical element at the intersection point of the surface of the reflective optical element at the first optical element side with the optical axis of the reflective optical element.

According to the sixth embodiment of the present invention, it may be possible to provide a more compact projection optical system including a deflecting element provided to be closer to a reflective optical element.

For a more specific example of the sixth embodiment of the present invention, there is provided the projection optical apparatus that is a more specific example of the fourth or fifth embodiment of the present invention, wherein the projection optical path is deflected by an optical path deflecting member as described above and then traverses the imaging light beam passing between the first optical system and the reflecting mirror having a positive power which constitutes the second optical system.

In the projection optical apparatus, the second optical system has a function of reflection, whereby it may be possible to increase a deflection angle, to facilitate guiding to the deflecting element, and to realize a more compact optical system. More particularly, because an optical system forming an intermediate image is used, a location at which light rays are condensed, which location may correspond to a so-called "stop", is provided in the second optical system, and then, the deflecting element is arranged near here, whereby it may be possible to reduce the size of the deflecting element, Also, it may be possible to reduce the size of the projection optical apparatus. Particularly, when the second optical system is composed of a reflecting mirror, it may be possible to fold the optical path for folding the apparatus and further it may be possible to utilize the space for the optical path of projection more efficiently due to the deflecting element.

The seventh embodiment of the present invention is the projection optical system according to any of the first to sixth embodiments of the present invention, wherein the projection optical system further includes means for adjusting arrangement of the deflecting element.

Herein, for the means for adjusting arrangement of the deflecting element, for example, means for changing the position of a deflecting element (means for moving a deflecting element) and means for changing the orientation of a deflecting element (means for rotating a deflecting element) are provided. The means for moving a deflecting element is not particularly limited, and for example, driving mechanisms for moving a deflecting element along a guide rail and driving mechanisms for moving a deflecting element by means of an arm are provided. Also, the means for rotating a deflecting element is not particularly limited, and for example, driving mechanisms for rotating a deflecting element around one side of the deflecting element as a rotational axis are provided.

According to the seventh embodiment of the present invention, it may be possible to provide a projection optical system capable of adjusting the optical path of a light beam which is deflected by a deflecting element.

For a more specific example of the seventh embodiment of the present invention, there is provided the projection optical apparatus that is a more specific example of any of the first to sixth embodiments of the present invention, wherein the position of a projected image is adjustable by displacing the position of the deflecting element.

In the projection optical apparatus, it may be possible to obtain a mechanism for readily correcting, for example, tilt of an image which may be caused by, for example, tilt of the apparatus.

More particularly, it may be possible to obtain a mechanism capable of readily correcting, for example, tilt of a projected image, by means of adjustment of the position of a deflecting element or adjustment of the angle thereof, because the deflecting element has no power.

An eighth embodiment of the present invention is the projection optical system according to the seventh embodiment of the present invention, wherein the means for adjusting the position of a deflecting element include means for moving a deflecting element.

According to the eighth embodiment of the present invention, it may be possible to provide a projection optical system capable of making it more compact by moving a deflecting element.

The ninth embodiment of the present invention is the projection optical system according to any of the first to eighth embodiments of the present invention, wherein the projection optical system further includes means for adjusting arrangement of the at least one optical element.

Herein, for the means for adjusting arrangement of the at least one optical element, for example, means for changing the position of (at least one of) the at least one optical element (means for moving (at least one of) the at least one optical element) and means for changing arrangement of the at least one optical element (means for rotating (at least one of) the at least one optical element) are provided. The means for moving (at least one of) the at least one optical element are not particularly limited, and for example, driving mechanisms for moving (at least one of) the at least one optical element along a guide rail and driving mechanisms for moving (at least one of) the at least one optical element by means of an arm are provided. Also, the means for rotating (at least one of) the at least one optical element are not particularly limited, and for example, driving means for rotating (at least one of) the at least one optical element around one axis perpendicular to the optical axis of (at least one of) the at least one optical element as a rotational axis are provided.

According to the ninth embodiment of the present invention, it may be possible to provide a projection optical system capable of making it more compact by adjusting arrangement of the at least one optical element.

A tenth embodiment of the present invention is the projection optical system according to the ninth embodiment of the present invention, wherein the means for adjusting arrangement of the at least one optical element are means for moving the at least one optical element.

According to the tenth embodiment of the present invention, it may be possible to provide a projection optical system capable of making it more compact by moving the at least one optical element.

For a more specific example of the eighth, ninth or tenth embodiment of the present invention, there is provided the projection optical apparatus that is a more specific example of any of the first to seventh embodiment of the present invention, wherein either or both of an optical element constituting the second optical system and the deflecting element is/are movable to the first optical system side at the time of non-projection.

In the projection optical apparatus, it may be possible to improve a function such as portability, which is particularly required for its application to a front type one. More particularly, the deflecting element or an element constituting the second optical system is movable at the time of non-projection whereby compactness may be attained at the time of storage, particularly in the case of its application to a front type one, and it may be possible to provide a projection optical apparatus with space for efficient storage or placement or improved portability of the apparatus.

An eleventh embodiment of the present invention is the projection optical system according to any of the first to tenth embodiment of the present invention, wherein the projection optical system is a projection optical system for projecting an image conjugate to the object onto a projection surface under the plural optical elements.

Herein, the projection surface under the plural optical elements means a projection located under the optical axis of each of the plural optical elements.

According to the eleventh embodiment of the present invention, it may be possible to provide a projection optical system in which dust and dirt are more reduced which may deposit on a deflecting element for deflecting the optical path of a light beam toward a projection surface under the plural optical elements.

For a more specific example of the eleventh embodiment of the present invention, there is provided the projection optical apparatus that is a more specific example of any of the first to tenth embodiments of the present invention, wherein the projection optical apparatus projects a display image from upside to downside.

In the projection optical apparatus, it may be possible to provide a projection system for which deposition of dust and dirt on a mirror member is prevented readily. More particularly, because it may be possible to orient the surface of a mirror that is the deflecting element downward, the amount of deposited dust or dirt may be small even in use for a long time and it may be possible to prevent degradation of projection quality. Also, it may be possible to prevent heat absorption of dust or dirt and therefore it may be possible to prevent reduction of the reliability of a mirror surface which may be caused by heat as much as possible.

A twelfth embodiment of the present invention is an image displaying apparatus including an image generating device generating an image and an image projecting and displaying device projecting and displaying an image generated by the image generating device onto or on a projection surface, wherein the image projecting and displaying device includes the projection optical system according to any of the first to eleventh embodiments of the present invention.

Herein, the projection surface may be identical to the projection surface in the projection optical system that is any of the first to eleventh embodiments of the present invention.

According to the twelfth embodiment of the present invention, it may be possible to provide an image displaying apparatus including a more compact projection optical system. Accordingly, it may also be possible to provide a more compact image displaying apparatus.

For a more specific example of the twelfth embodiment of the present invention, there is provided a displaying apparatus composed of at least image generating means and the projection optical apparatus that is a more specific example of any of the first to eleventh embodiments of the present invention and projecting and displaying an image formed on the image generating means.

In the displaying apparatus, it may be possible to reduce the height of a projector apparatus and to reduce the volume of the apparatus. More particularly, the projection light transverses a light beam in the projection optical system due to the deflecting element, whereby it may be possible to utilize the occupied space efficiently and to attain slimming of the projection system. In particular, in regard to a rear projection optical system, it may be possible to realize a compact apparatus. Also, in regard to a front projector, it may be possible to reduce its projection space. Therefore, it may be possible to reduce the height of a projector apparatus and to reduce the volume of the apparatus.

A thirteenth embodiment of the present invention is the image displaying apparatus according to the twelfth embodiment of the present invention, wherein the image displaying apparatus is a front-projection-type image displaying apparatus.

According to the thirteenth embodiment of the present invention, it may be possible to provide a front-projection-type image displaying apparatus including a more compact projection optical system.

For a more specific example of the thirteenth embodiment of the present invention, there is provided the displaying apparatus that is a more specific example of the twelfth embodiment of the present invention, wherein the displaying apparatus is a front-projection-type (front-type) one.

In the displaying apparatus, it may be possible to provide a displaying apparatus with a smaller apparatus size, which may be required, particularly in the case of its application to a front-type one.

Next, some practical examples according to the embodiments of the present invention will be described with reference to the drawings.

PRACTICAL EXAMPLE 1

Figure 2:
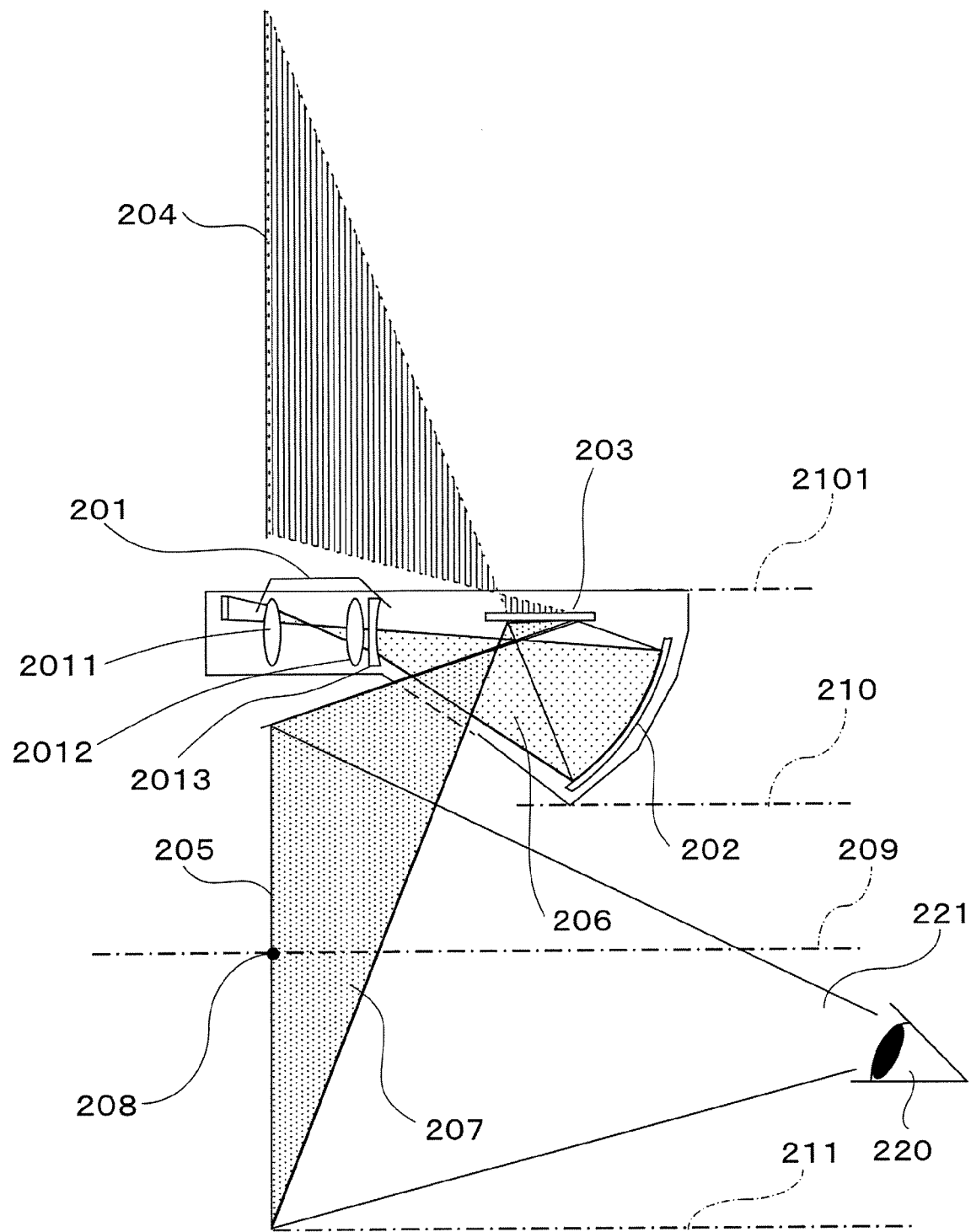
FIG. 2 is a diagram illustrating the configuration of a projection optical apparatus of practical example 1 according to an embodiment of the present invention.
Figure 3:
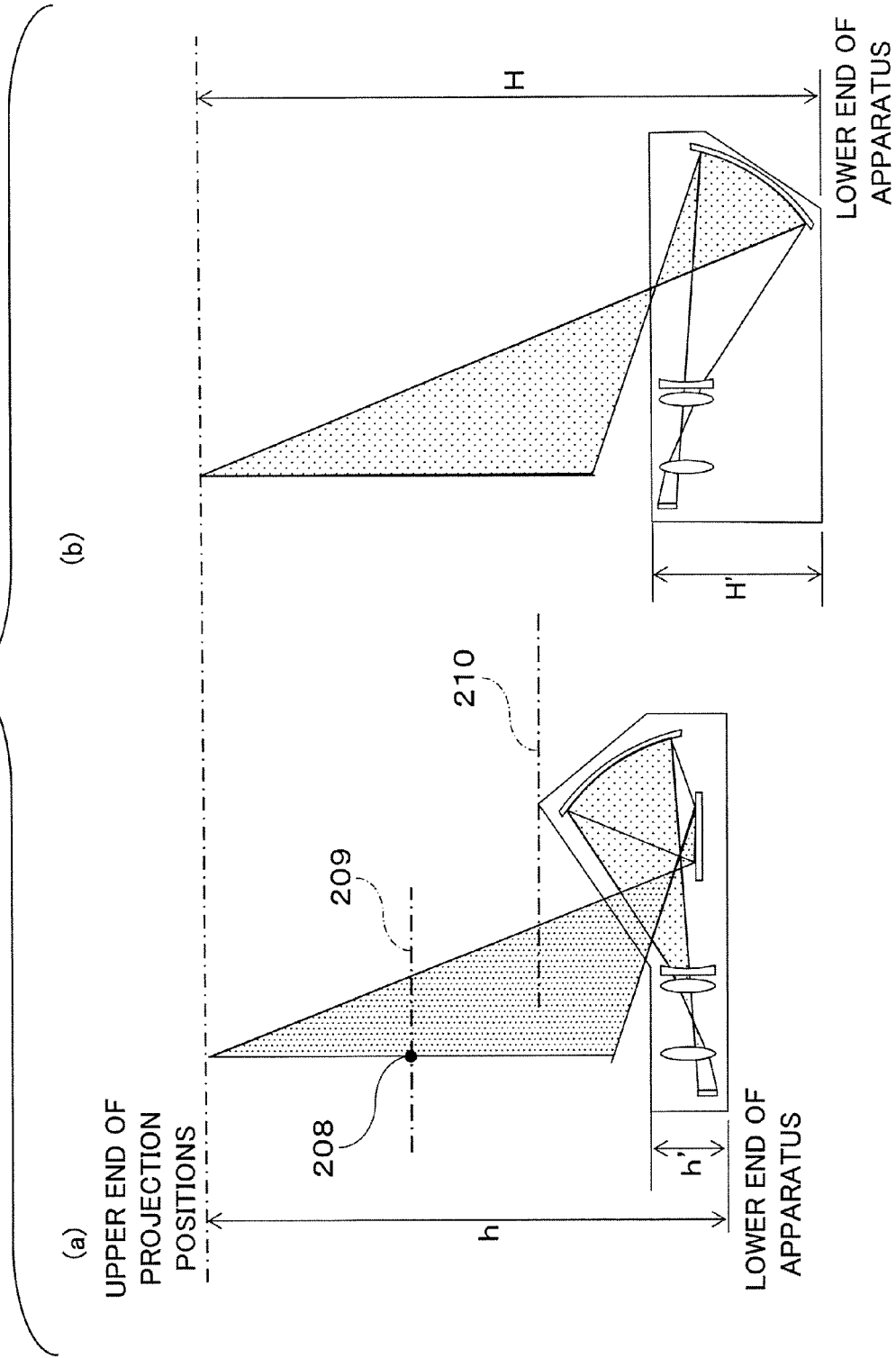
FIG. 3 is a diagram illustrating the effect of a projection optical system of practical example 1 according to an embodiment of the present invention.

FIG. 2 is a diagram illustrating the configuration of a projection optical apparatus of practical example 1 according to an embodiment of the present invention. FIG. 3 is a diagram illustrating the effect of a projection optical apparatus of practical example 1 according to an embodiment of the present invention. FIG. 3(a) is one part of the diagram illustrating a projection optical apparatus of practical example 1 according to an embodiment of the present invention and FIG. 3(b) is the other part of the diagram which part illustrates an example of a conventional projection optical apparatus.

A projection optical apparatus 200 shown in FIG. 2 includes an object, a projection optical system for enlarging and projecting information of the object, and an optical path deflecting element 203.

Herein, the projection optical system is composed of a first optical system 201 and a second optical system 202, wherein the first optical system 201 is an optical system composed of plural optical elements having a power and the second optical system 202 is composed of a single optical element having a power. The first optical system 201 and the second optical system 202 are designed integrally and optimally. It is indicated that the first optical system 201 is a refractive optical system and the second optical system 202 is a reflective optical system.

Additionally, FIG. 2 is a schematic diagram of the projection optical apparatus. In order to obtain a desired imaging performance of, for example, the first optical system 201, usually, it is configured by combination of plural lenses and optimized by means of a conventionally used lens design simulation. For example, it is desirable that the first optical system 201 be composed of plural refractive lenses. For a preferable lens configuration, there is provided a "positive-positive-negative" configuration that is composed of a first lens group or lens 2011 having a positive power totally, a second lens group or lens 2012 having a positive power totally, and a third lens group or lens 2013 having a negative power totally. However, the lens groups are omitted in the figure. Of course, the first optical system 201 may be a mirror optical system or may be a combination of a lens and a mirror. In FIG. 2, the first optical system 201 is schematically shown as three refractive optical elements but is not limited to an optical system composed of three refractive optical elements or groups.

Also, the second optical system 202 is composed of a concave mirror. The concave mirror inherently has a positive power and therefore is preferable. Of course, it may be composed of plural mirrors in order to obtain a desired imaging performance or a refractive optical system may be added. The specific shape of the concave mirror is preferably a rotationally symmetric aspherical shape and more preferably a free-form surface mirror shape with a higher degree of freedom. For example, the free-form surface mirror is preferably an X-Y polynomial curved surface whose curvatures in X directions and Y directions are different from each other, wherein a Z axis is in the directions of its optical axis, an X axis is in the horizontal directions and a Y axis is in the vertical directions.

Furthermore, the optical path deflecting element 203 extends from the projection optical system composed of the first optical system 201 and the second optical system 202 to the position of a projected image 205 in the projection optical path. In practical example 1 of the present invention, the optical path deflecting element 203 is a plane mirror arranged parallel to the optical axis of the first optical system 201 but, of course, is not limited to a plane mirror. The optical path deflecting element 203 may also be a Fresnel-type deflecting element having no lens convergence function (and having no power). The size of the optical path deflecting element 203 is smaller than the size of the second optical system 202. Because the second optical system 202 has a positive power, the optical path deflecting element 203 which is smaller than the second optical system 202 may be arranged in order that a light beam is converged toward the optical path deflecting element 203 as indicated in the optical path diagram shown in FIG. 2.

As shown in FIG. 2, an imaging light beam 206 emitted from an object and having passed through optical elements constituting the first optical system 201 is reflected by the second optical system 202 in the projection optical apparatus 200. Herein, if the projection optical apparatus 200 did not include the optical path deflecting element 203, light reflected from the second optical system 202 would form a projected image 204 in the case where no optical path deflecting mirror is provided. However, the optical path of light reflected from the second optical system 202 is deflected by the optical path deflecting element 203 in the projection optical apparatus 200 of practical example 1 of the present invention. A projection light beam 207 emanating from the projection optical system, whose optical path is deflected by the optical path deflecting element 203, forms the projected image 205 on the opposite side of the projected image 204 in the case where no optical path deflecting element is provided for the first optical system 201.

In addition, practical example 1 of the present invention is a projection optical system in which an intermediate image is formed by the first optical system 201 and then is enlarged and projected by the second optical system 202. Information on an object plane is slightly enlarged by the first optical system 201 so as to form an intermediate image. The intermediate image is enlarged and projected by the second optical system 202. The position of the formed intermediate image, which is not shown in the figure, is provided between the first optical system 201 and the second optical system 202. The imaging performance of an intermediate image per se is not particularly problematic if the entire optical system is optimized so as to obtain a desired imaging performance at the position of a projected image. In such an optical system, the optical path deflecting element 203 extends from the projection optical system to the position of projection. Then, the optical path of a projection light beam is deflected by the optical path deflecting element 203 and the deflected projection light beam 207 transverses the imaging light beam 206 in an optical path inside the projection optical system and is projected. Additionally, an intermediate, image is formed in the projection optical system but the intermediate image is not necessarily required. Furthermore, the intermediate image may be located anywhere in the projection optical system if enough space through which the projection light beam 207 passes is kept. It may be only necessary to keep the space through which the projection light beam 207 passes, by means of a conventionally used lens design.

Furthermore, as shown in FIG. 2, a screen is arranged such that the normal line 209 passing through the center 208 of the projected image 205 never transverse the projection optical system (any of its optical element or the space between the optical elements). That is, both the first optical system 201 and second optical system 202 which constitute the projection optical system are arranged at one side of the normal line 209.

As described more specifically below, the projection apparatus has a first end 210 and a second end 2101 in the vertical directions, wherein both of them are arranged at one side of the normal line 209 and on the opposite side of the bottom 211 of the projection positions with respect to the normal line 209.

Due to such a relationship of arrangement, a sufficient viewing area of the projected image 205 is kept. As, shown in FIG. 2, the field of view of a viewer 220 is not interrupted. It is found that the position of the viewer 220 is not limited, at least, in the vertical directions shown in FIG. 2. This could hardly been attained by the configuration of the conventional art as disclosed in JP-A-2007-212748.

Thus, a novel configuration in practical example 1 of the present invention, as is not disclosed conventionally, is that there is provided a configuration such that the normal line passing through the center of a projected image never transverse the projection optical system (any of its optical elements or the space between the optical elements) and the optical path deflecting element 203 is arranged such that the projection light beam 207 of light rays emanating from a projection system such as a projection lens transverses the imaging light beam 206 on an optical path inside the projection optical system, that is, passes through the inside space of the projection system and is projected, which is one of the features of practical example 1 of the present invention.

Meanwhile, whereas there is a conventional art such that plural optical paths are folded and transverse one another and a folding element per se is an optical element contributing to the performance of an optical system, practical example 1 of the present invention is characterized in that the optical path deflecting element 203 is a deflecting element that substantially has no power, for example, a plane mirror. Thus, because the optical path deflecting element 203 has no power, the performance of a finished projection optical system is not affected and it may be possible to change the location of the optical path deflecting element 203 to some extent thereby freely setting a desired position of the projected image. Also, it may be possible to rotate the optical path deflecting element 203 to some extent. As is clearly seen in FIG. 2, it may be only necessary that its range is such that the projection light beam 207 and the projection apparatus interfere with each other.

Due to use of such a configuration, it may be possible to utilize a desired space required for imaging (space required for satisfying a lens performance) as a space occupied by the projection light beam 207 and it may be possible to utilize a space extending from an object to an imaging plane and occupied by an imaging system efficiently. Because such a feature is included, the viewing area of a projected image may be large. Also, it may be possible to provide a compact apparatus and an optical system suitable for a front-type one, that is, a front-projector-type one.

As shown in FIG. 3, the height of the entire system from the lower end of the apparatus to the upper end of projection positions is reduced from H for a conventional art to h for the configuration of practical example 1 of the present invention. Also, in regard to the height of the apparatus from its bottom, whereas H' is required for a conventional art, most of the apparatus has a height equal to or less than h' for the configuration for practical example 1 of the present invention, which indicates a more compact one, although there is a projecting part of the mirror.

PRACTICAL EXAMPLE 2

Figure 4:
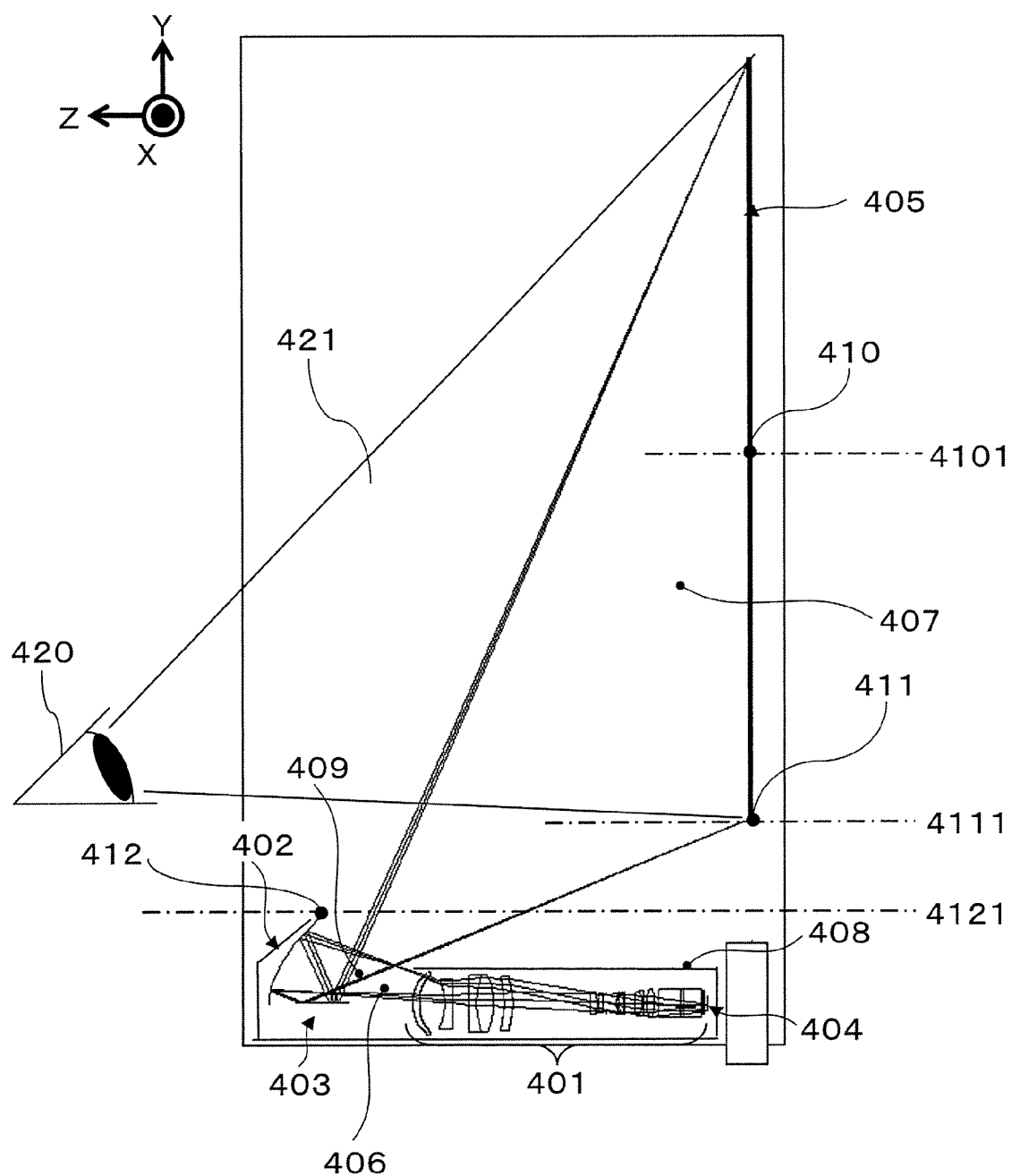
FIG. 4 is a diagram illustrating the configuration of a projection optical apparatus of practical example 2 according to an embodiment of the present invention.

FIG. 4 is a diagram illustrating the configuration of a projection optical apparatus of practical example 2 according to an embodiment of the present invention.

A projection optical apparatus 400 shown in FIG. 4 includes an object 404, a projection optical system for enlarging and projecting the object 404, and a deflecting element 403.

Herein, the projection optical system is composed of a first optical system 401 and a second optical system 402, wherein the first optical system 401 is an optical system composed of plural optical elements having a power and the second optical system 402 is a reflective optical system. Also, the first optical system 401 and the second optical system 402 are optimally designed to obtain a desired imaging performance totally. A more preferable example is configured such that the first optical system 401 is composed of plural refractive lenses. On the other hand, the second optical system 402 is composed of a concave mirror. Accordingly, the second optical system 402 is allowed to have a combination of a positive power and an optical path deflecting function. Furthermore, the deflecting element 403 is arranged in the projection optical path from the projection optical system composed of the first optical system 401 and the second optical system 402 to the position of a projected image 405.

As shown in FIG. 4, in the projection optical apparatus 400, an imaging light beam 406 emitted from an object 404 such as a light valve and passing through an optical element constituting the first optical system 401 is reflected by the second optical system 402. Herein, in the projection optical apparatus 400 of practical example 1 of the present invention, the optical path of light reflected from the second optical system 402 is deflected by the deflecting element 403. A projection light beam 407 emanating from the projection optical system and having an optical path deflected by the deflecting element 403 forms the projected image 405 on the display position of a screen or the like.

Furthermore, an intermediate image is formed between the first optical system 401 and the second optical system 402 in practical example 2 of the present invention. The projection optical system in practical example 2 of the present invention is a projection optical system in which an intermediate image is formed by the first optical system 401 and then is enlarged and projected by the second optical system 402. Information on an object plane is slightly enlarged by the first optical system 401 so as to form an intermediate image. The intermediate image is enlarged and projected by the second optical system 402. If a desired imaging performance is obtained totally, the imaging performance of the intermediate image is not particularly problematic. In such an optical system, the deflecting element 403 is arranged between the projection optical system and the projection position to deflect the projection light beam 407 and the deflected projection light beam 407 is projected to transverse the imaging light beam 406 (intersectional region 409) inside the projection optical system. In practical example 2 of the present invention, the deflecting element 403 is a plane mirror arranged parallel to the optical axis of the first optical system 401 but, of course, is not limited to a plane mirror. Furthermore, the deflecting element 403 may be a Fresnel-type deflecting element having a lens convergence function (and having no power).

As shown in FIG. 4, when the normal line 4101 of a screen at the center 410 of the projected image 405, the height 4111 of the lower end 411 of the projected image 405 at a position closest to the projection apparatus, and the height 4121 of the upper end of the projection apparatus at a position closest to the projected image are defined and X, Y, and Z axes are defined such that X axis is in the horizontal directions and Y axis is in the vertical directions. The normal line 4101 of a screen at the center 410 of the projected image 405 is arranged not to traverse the projection optical system (any of optical elements or the space between the optical elements, that is, the first optical system 401, the second optical system 402, or even the imaging light beam 406). That is, the first optical system 401 and the second optical system 402 are arranged at one side of the normal line 4101 without putting the normal line 4101 therebetween.

Moreover, the height 4121 of the upper end 412 of the projection apparatus is positioned at a position lower than the height 4111 of the lower end 411 of the projected image 405 (in the −Y direction).

Due to such a relationship of arrangement, a sufficient viewing area of the projected image 405 is kept. That is, as shown in FIG. 4, it is found that the field of view of a viewer 420 is not interrupted. At least, the position of the viewer 420 is not limited in the vertical directions shown in FIG. 4. This could hardly been attained by the configuration of a conventional art as disclosed in JP-A-2007-212748.

It is desirable that the position of the deflecting element 430 be preferably arranged in the maximum effective diameter of the projection optical system functioning to obtain a projected image. That is, it may be only necessary to arrange the projection optical system composed of the first optical system 401 and the second optical system 402 inside a housing 408 holding them integrally. Although a so-called lens tube or holding member for holding a lens is not shown in the figure and the housing 408 surrounding the least components for illustrating an embodiment of the present invention is shown, it may be only necessary to arrange it in the minimum region. Of course, if another component as required is added, a wider space for arrangement is needed.

It is preferable to apply an embodiment of the present invention to an optical system as disclosed in Japanese Patent Application Publication No. 2004-258620 (JP-A-2004-258620) as previously filed by the applicant(s), an optical system as disclosed in JP-A-2004-309765 or optical system as disclosed in JP-A-2006-235516 as described in the Background Art, or the like. In particular, the optical system as disclosed in JP-A-2004-258620 relates an enlargement and projection optical system using a refractive optical system and a concave mirror.

It may be only necessary to provide a configuration such that light rays reflected from the concave mirror, that is, the projection light beam 407 used for illustrating practical example 2 of the present invention is/are folded by a plane mirror or the like so as to pass through the space between the refractive optical system and the concave mirror. Due to use of such a configuration, it may be possible to attain a compact projection system and to reduce the size of a projection optical apparatus in the case of its application to the apparatus and various effects contributing to attainment of a compact apparatus may be obtained which include improvement of its installability, improvement of its portability, attainment of a compact housing (involving requirement of precision) and reduction of raw materials.

The special effect of using an optical system obtaining an intermediate image is to reduce the size of the deflecting element 403 because a location corresponding to a so-called "stop" where light rays are condensed is provided in the second optical system 402 and the deflecting element 403 is arranged near here. Also, because light rays are condensed near the "stop" of the second optical system 402, spread of the projection light beam 407 is comparatively small.

In the optical system obtaining an intermediate image, it is drastically easy to transverse with the imaging light beam 406 compared to another conventional optical system forming no intermediate image. Meanwhile, because the width of the projection light beam 407 gradually increases in a conventional enlargement and projection system after the light beam exits from the projection optical system, the idea of passing through the inside of a projection optical system could not have been obtained in practice. Furthermore, because an imaging optical system is usually installed in a lens tube or the like for the purpose of separating it from the surroundings, the idea of passing the projection light beam 407 through the imaging light beam 406 would not be obtained usually. On the other hand, in practical example 2 of the present invention, a configuration is used such that the imaging light beam 406 transverses the projection light beam 407 so as not to cause degradation of its projection performance due to flare light while attention is focused on the rectilinear progression of the projection light beam.

Although the optical systems suitable for the present invention have been described above, an oblique projection optical system is supplementally provided in regard to the configuration of an optical system having a further and particular effect. That is, the case is to shift an object such as a light valve (displace it from the optical axis of the first optical system) so as to conduct projection in an oblique direction. Furthermore, the case is a configuration such that the second optical system is composed of a reflective optical system and the second optical system projects from one side of the optical axis (corresponding examples: the projection optical system of FIG. 4, a conventional art in FIG. 1 of JP-A-2006-235516, and the like). Also, although a shift of the position of an object may not necessarily be provided, the case is a projection optical system in which the size of the second optical system is greater than the effective diameter of the first optical system, which also applies to an optical system in which the second optical system is shifted to one side of the first optical system (for example, a conventional art in JP-A-2004-309765 (FIG. 2) and the like).

If the deflecting element of an embodiment of the present invention was not provided in such a projection optical system, the projection light beam would travel to the opposite side (referred to as side B; not shown) of the side (referred to as side A; not shown) to which the second optical system is shifted so as to form a projection image. However, its optical path is folded by the deflecting element of an embodiment of the present invention and further the light beam passes between the plural optical elements so as to be projected to side A as described above, whereby it may be possible to utilize the space at the side to which the second optical system is shifted, efficiently. Therefore, it may be possible to realize a more compact projection optical system and projection optical apparatus.

PRACTICAL EXAMPLE 3

Figure 5:
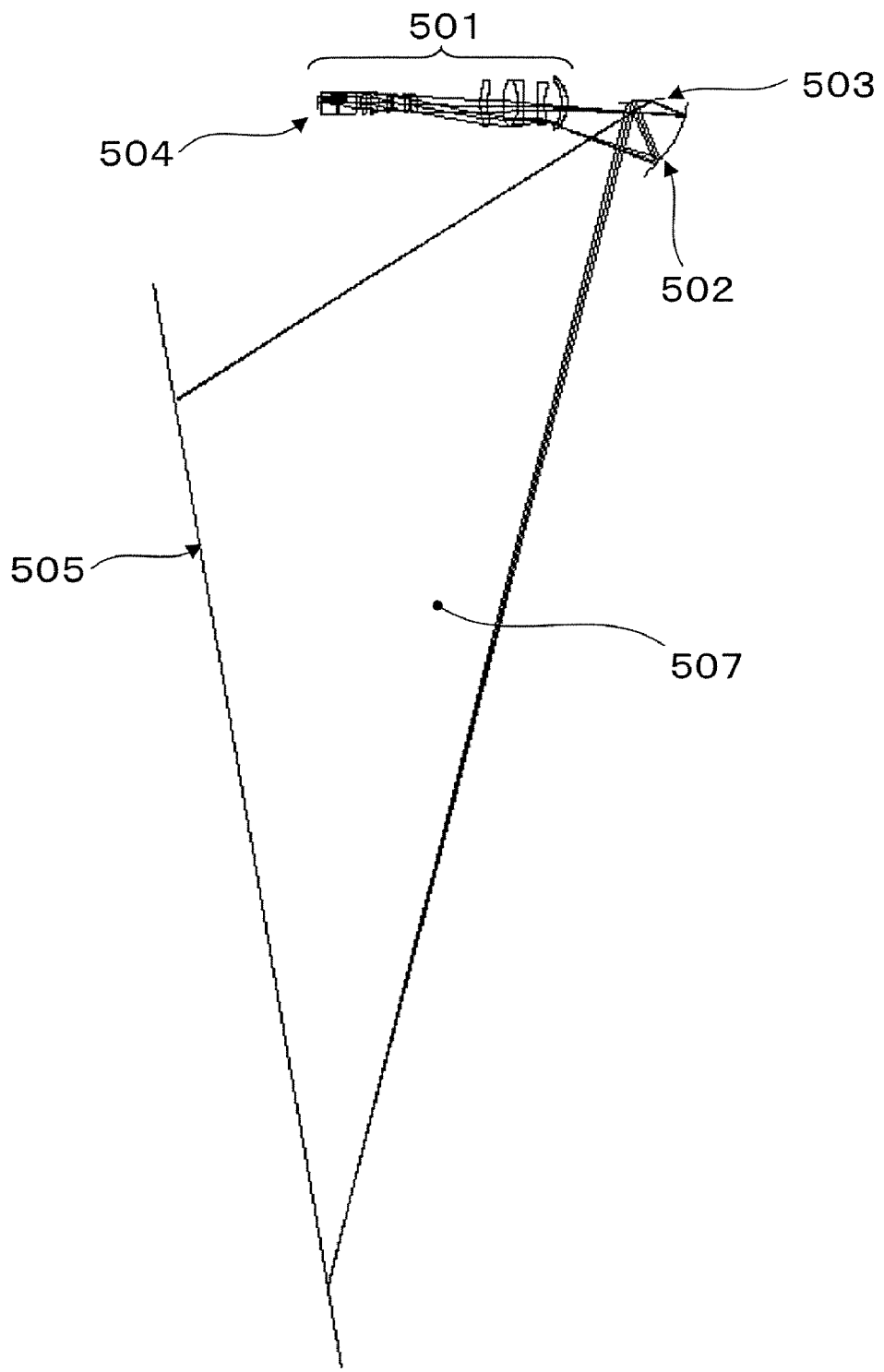
FIG. 5 is a diagram illustrating the configuration of a projection optical apparatus of practical example 3 according to an embodiment of the present invention.

FIG. 5 is a diagram illustrating the configuration of a projection optical apparatus of practical example 3 according to an embodiment of the present invention. In a projection optical apparatus 500 in FIG. 5, a first optical system 501, a second optical system 502, a deflecting element 503, an object 504, a projected image 505, and a projection light beam 507 are similar to the first optical system 201, 401, the second optical system 202, 402, the (optical path) deflecting element 203, 403, the object, the projected image 205, 405, and the projection light beam 207, 407, as shown in FIG. 2 or FIG. 4, respectively. However, practical example 3 of the present invention is characterized in that the angle of the deflecting element in practical example 1 or 2 of the present invention is variable. The adjustment of the position of the projected image is allowed by using such a configuration, as shown in FIG. 5. That is, in FIG. 5, the tilt of the deflecting element is changed so as to displace the projected image. The effect of allowing the adjustment of the position of the projected image could hardly been obtained by a conventional art.

PRACTICAL EXAMPLE 4

Figure 6A:
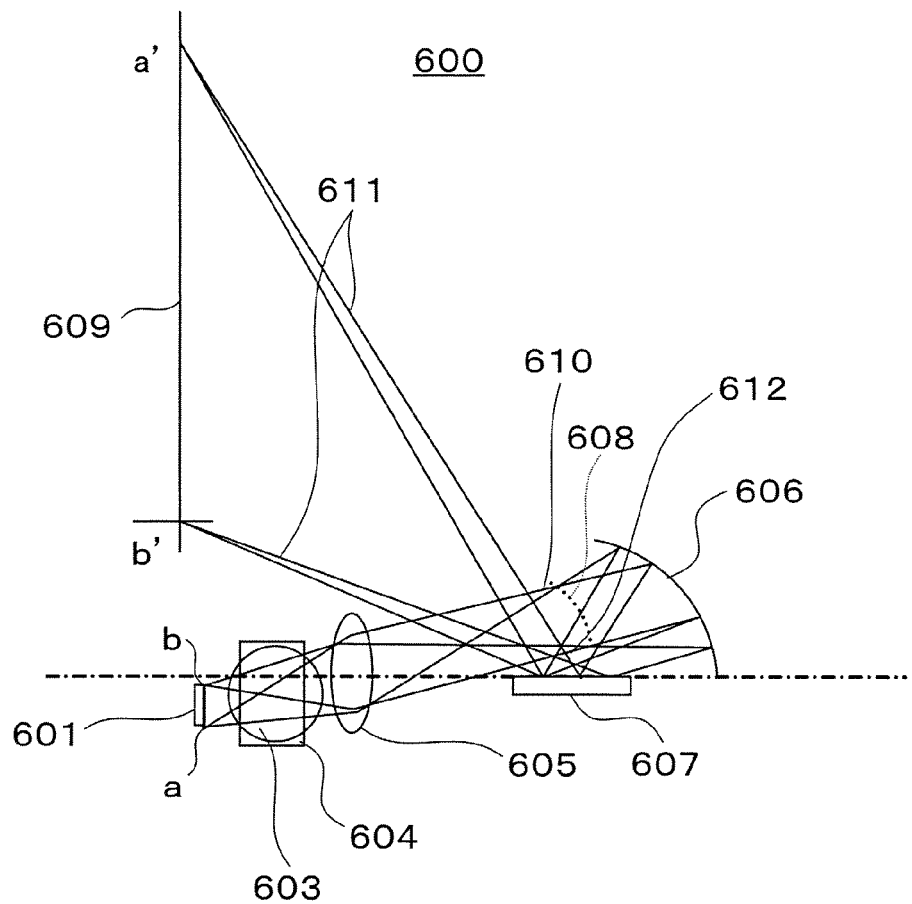
FIG. 6A and FIG. 6B are diagrams illustrating the configuration of a displaying apparatus of practical example 4 according to an embodiment of the present invention.
Figure 6B:
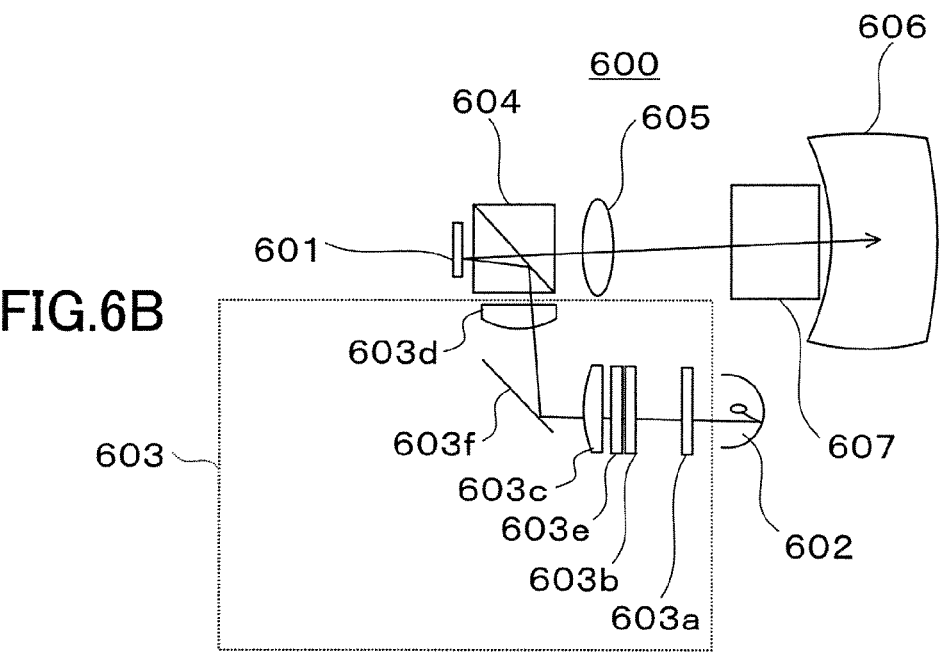

FIG. 6A and FIG. 6B are diagrams illustrating the configuration a displaying apparatus of practical example 4 according to an embodiment of the present invention. FIG. 6A is a side view of the displaying apparatus of practical example 4 and FIG. 6B is a top view of the displaying apparatus of practical example 4.

FIG. 6A and FIG. 6B show a displaying apparatus 600 to which a projection optical apparatus of any of the practical examples of the present invention is applied. The displaying apparatus 600 is a displaying apparatus which is composed of at least image generating means and a projection optical apparatus of any of the practical examples of the present invention and projects and displays an image formed by the image generating means.

Additionally, a first optical system 605, a second optical system 606, a deflecting element 607, an intermediate image 608, a projected image 609, an imaging light beam 610, a projection light beam 611, and an intersectional region 612 in practical example 4 of the present invention are similar to those of practical examples 1 to 3 of the present invention.

Herein, this practical example is composed of a light valve (reflection-type liquid crystal panel) 601 used as image generating means, a light source 602 (an extra-high pressure mercury lamp, a halogen lamp, a xenon lamp, or the like) for illuminating the light valve 601, and a uniform illumination optical system 603 for uniforming the distribution of the light intensity distribution of a lamp (optical systems composed of a first fly-eye lens 603a, a second fly-eye lens 603b, a main condenser lens 603c, a sub-condenser lens 603d, and optionally a folding mirror 603f whereby uniform illumination on the light valve 601 is conducted efficiently, and the like). Furthermore, a light polarization conversion element 603e or the like is usually used for conducting highly efficient illumination on the liquid crystal panel 601 because the lamp light source 602 is not polarized. The above-mentioned configuration of the illumination optical system 603 is provided by way of example only and the illumination optical system 603 is not limited. For another practical example, a transmission-type liquid crystal panel, an element in which micro-mirrors corresponding to picture elements are arrayed two-dimensionally and light modulation is conducted by inclining each mirror, or the like may be used for the panel 601. Light polarization conversion is essential for a liquid crystal panel using polarized light in order to improve its efficiency but is not particularly required for a panel independent of light polarization.

FIG. 6A and FIG. 6B show a practical example of the displaying apparatus 600 including the reflection-type liquid crystal panel 601, wherein sufficiently-polarized illumination light reaches the reflection-type liquid crystal panel 601 through an optical path separating element 604. For the optical path separating element 604, a polarization beam splitter (referred to as a PBS, below) is preferable. A light beam reflected from the PBS and illuminating the panel 601 forms image light on the light valve depending on an input image signal. Additionally, light is commonly modulated on a picture element basis. Modulated image light is separated from illumination light by the PBS and is directed to the projection optical apparatus of the practical example of the present invention. Then, these are covered by a case for holding them integrally so as to provide the projection-type displaying apparatus 600.

Furthermore, it may be possible to conduct its application to an optical system as shown in FIG. 3 readily. Although practical example 4 in regard to image generation as described above is a case of one panel 601, panels corresponding to red, green, and blue may be prepared. Then, after separating illumination light into the three colors and separating each of them into illumination light and projection light as described above, the three colors may be combined and introduced to the projection optical system. The light source 602 is a lamp light source above but an LED light source or an LD light source may be used. In that case, an illumination optical system suitable for the light source is used. If the image generating means per se are self-luminous elements, the illumination optical system 603 is not required.

Furthermore, another image generating device includes an image generating system in which a display image is obtained by two-dimensionally scanning LD light sources and modulating and driving each picture element. In this case, a scanning optical path for obtaining a projected image corresponds to the projection optical path.

PRACTICAL EXAMPLE 5

FIG. 7 is a diagram illustrating the configuration of a projection optical apparatus of practical example 5 according to an embodiment of the present invention. As shown in FIG. 7, a projection optical apparatus 700 of practical example 5 of the present invention includes a first optical system 701 such as a refractive optical system, a second optical system 702 such as a concave mirror, and a deflecting element 703 such as a reflecting mirror, similarly to the projection optical apparatuses of practical examples 1 to 3 of the present invention, wherein the optical path of a light beam emitted from an object plane 704 is deflected by the deflecting element 703 and a projection light beam 706 deflected by the deflecting element 703 is projected onto a screen surface 705 at the position of projection.

However, the projection optical beam is projected from the upside to the downside with respect to the first optical system 701 and the second optical system 702 in the projection optical apparatus 700 shown in FIG. 7 (light rays for a half of an imaging plane are not shown in FIG. 7).

A so-called front projector that is commonly used in an office is placed on a desk and conducts projection on a screen arranged in front. In recent years, for example, an apparatus for projection on a wall or the like from the upside to the downside has been commercialized and it may be possible to conduct downward projection easily without changing the orientations of so-called projector engine parts such as an illumination system, an optical system around a panel, and a projection optical system, by using the configuration of practical example 5 of the present invention. According to need, the deflecting element 703 may be detachable. An apparatus using upward projection and downward projection in combination may also be obtained. Of course, the apparatus itself may be reversed vertically, and however, improvement of the degree of freedom of its layout obviously provides an advantageous effect on the design of the apparatus.

Additionally, it is obvious from the figure that the reflective surface of the deflecting element 703 which is a component required for practical example 5 of the present invention is directed downward by projecting the projection light beam from the upside to the downside, which results in being resistant to the deposition of dust and the like. Furthermore, because no light ray travels to the back surface of the deflecting element 703, it is rather preferable to cover the optical system completely in order that external stray light does not enter the optical system from the upside thereof, although its illustration is omitted in the figure. When such a configuration is used, the reflecting mirror of the concave mirror is oriented slightly upward and it may be possible to obtain a very advantageous configuration from the viewpoint of dust prevention.

PRACTICAL EXAMPLE 6

Figure 8A:
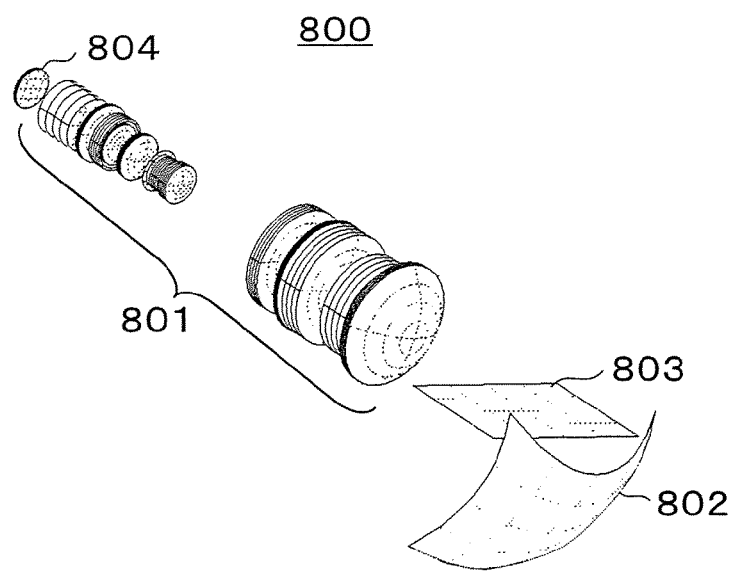
FIG. 8A, FIG. 8B, and FIG. 8C are diagrams illustrating the configuration of a projection optical apparatus of practical example 6 according to an embodiment of the present invention.
Figure 8B:
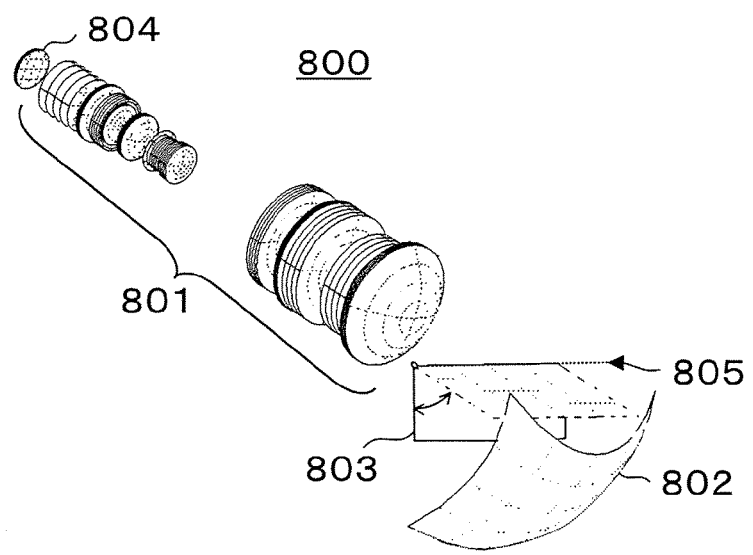
Figure 8C:
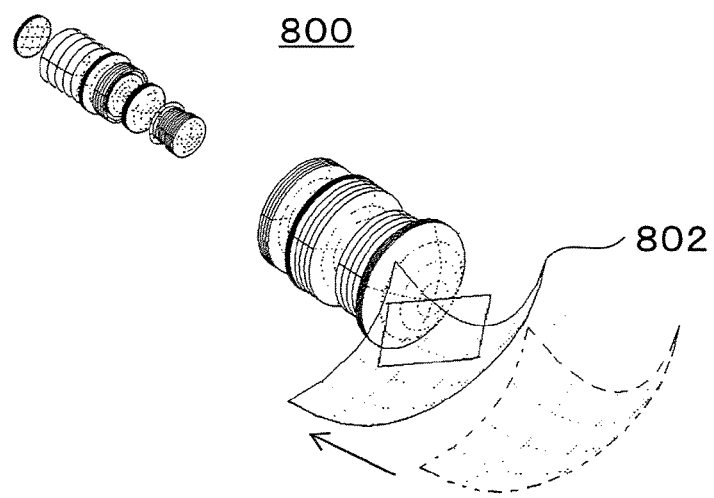

FIG. 8A, FIG. 8B, and FIG. 8C are diagrams illustrating the configuration of a projection optical apparatus of practical example 6 according to an embodiment of the present invention. FIG. 8A is a diagram showing the projection optical apparatus at the time when a light beam is projected (at the time of projection). FIG. 8B is a diagram showing the projection optical apparatus of practical example 6 in which a deflecting element is movable at the time when a light beam is not projected (at the time of non-projection). FIG. 8C is a diagram showing the projection optical apparatus of practical example 6 in which a concave mirror is movable at the time when a light beam is not projected (at the time of non-projection). More particularly, FIG. 8B is a diagram showing the condition that the deflecting element shown in FIG. 8A is movable and the deflecting element is moved to the first optical system side, and FIG. 8C is a diagram showing the condition that the concave mirror shown in FIG. 8A is movable and the concave mirror is moved to the first optical system side.

As shown in FIG. 8A, FIG. 8B, and FIG. 5C, a projection optical apparatus 800 of practical example 6 of the present invention includes a first optical system 801 such as a refractive optical system, a second optical system 802 such as a concave mirror, and a deflecting clement 803 such as a reflecting mirror, similarly to the projection optical apparatus of practical example 5 of the present invention and the like, wherein the optical path of a light beam emitted from an object plane 804 is deflected by the deflecting element 803 and a light beam deflected by the deflecting element 803 is projected onto a projection surface such as a screen surface.

The projection optical apparatus 800 of practical example 6 of the present invention is an example of the projection optical apparatus of practical example 5 of the present invention, wherein a concave mirror that is an optical element constituting the second optical system 802 and the deflecting element 803 are movable and are allowed to move to the first optical system 801 side at the time of non-projection. Light rays are not shown in the figure for convenience of illustration. Also, the projection optical apparatus 800 of practical example 6 of the present invention may be provided to the displaying apparatus such as that of practical example 4 of the present invention, wherein a light source, an illumination system, a light valve, and the like which are components required for a displaying apparatus are omitted for avoiding complexity of the figure and enlarged views of the projection optical system of practical example 5 of the present invention which is shown in FIG. 7. Furthermore, perspective drawings are provided such that the relationship of arrangement of the second optical system 802 such as a concave mirror and the deflecting element 803 can be seen.

As shown in FIG. 8A, a projected image is obtained at the time of projection of a light beam from the projection optical apparatus 800 as shown in FIG. 7. However, a configuration is provided such that the deflecting element 803, the second optical system 802, and the like project from the first optical system 801 at the time of non-projection of a light beam from the projection optical apparatus 800. These parts are movable, and as shown in FIG. 8C, a concave mirror that is an optical element constituting the second optical system 802 and the deflecting element 803 are allowed to move to the first optical system 801 side. Although a housing or the like for holding the second optical system 802 such as a concave mirror and the deflecting element 803 is not shown in FIG. 8A, FIG. 8B, and FIG. 8C for practical example 6 of the present invention, it may be only necessary to use a conventionally used driving mechanism so that the second optical system 802 or the deflecting element 803 is slid along a guide rail and moved or arm-driven. A configuration may be used such that a mechanism for rotating the second optical system 802 or the deflecting element 803 around one side thereof as an axis is provided so as to fold the second optical system 802 or the deflecting element 803. FIG. 8B shows the condition that the deflecting element 803 is folded upward around one side of the deflecting element as a rotational axis 805. Because the deflecting element 803 is folded to the first optical system 801 side, the gap between the deflecting element 803 and the second optical system 802 such as a concave reflecting mirror is increased and it may be possible to bring not only the deflecting element 803 but also the second optical system 802 such as a concave mirror close to the first optical system 801. Of course, it is possible to use various approaches for a method of moving the second optical system 802 or the deflecting element 803. Also, the deflecting element 803 may be a detachable configuration. In this case, it may be possible to choose the direction of projection of a light beam. Furthermore, only the concave mirror may be moved while the deflecting element may be fixed, as is not shown in the figures. Specifically, a configuration such that the concave mirror is folded to the deflecting element side so as to prevent the concave mirror from projecting at the time of storage, or the like, is included.

Although some embodiment(s) and practical example(s) have been described with reference to the drawings, for example, there is a possibility that the embodiment(s) and practical example(s) of the present invention would be available for a projection optical apparatus and a displaying apparatus using the same. For example, there is a possibility that the embodiment(s) and the practical example(s) of the present invention would be available for a projection optical apparatus for projecting and displaying an image generated by a light valve such as a liquid crystal panel, or a displaying apparatus using the same. Furthermore, for example, there is a possibility that the embodiment(s) and practical example(s) of the present invention would be available for a front projector or rear projector as a product or a projection optical system installed therein.

Although the embodiment(s) and specific example(s) of the present invention have been specifically described above, the present invention is not limited to the embodiment(s) or specific example(s) and the embodiment(s) and specific example(s) of the present invention can be altered or modified without departing from the spirit and scope of the present invention.

The present application claims the benefit of the priority dates of Japanese Patent application No. 2007-233249 filed on Sep. 7, 2007 and Japanese Patent Application No. 2008-159655 filed on Jun. 18, 2008, the entire contents of which applications are hereby incorporated by reference.

What is claimed is:

1. A projection optical system comprising:
a projection surface configured such that an image conjugate to an object is projected;
plural optical elements having a refractive power; and
a deflecting element having no refractive power configured to deflect an optical path of a light beam and to pass the light beam having a deflected optical path between the plural optical elements; and
wherein a normal line of the projection surface at a center of the projection surface does not pass through the plural optical elements or between the plural optical elements;
wherein the plural optical elements comprise a first optical system having a positive refractive power and configured to form an intermediate image conjugate to the object and a second optical system comprising at least one optical element and configured to form an image conjugate to the intermediate image;
wherein the deflecting element is provided in an optical path between the second optical system and the projection surface;
wherein a light beam from the deflecting element to the projection surface traverses a light beam from the first optical system to the second optical system; and
wherein the deflecting element is a detachable element.

2. A projection optical system comprising:
a projection surface configured such that an image conjugate to an object is projected;
plural optical elements having a refractive power; and
a deflecting element having no refractive power configured to deflect an optical path of a light beam and to pass the light beam having a deflected optical path between the plural optical elements; and
wherein a normal line of the projection surface at a center of the projection surface does not pass through the plural optical elements or between the plural optical elements;
wherein the plural optical elements comprise a first optical system having a positive refractive, power and configured to form an intermediate image conjugate to the object and a second optical system comprising at least one optical element and configured to form an image conjugate to the intermediate image;
wherein the deflecting element is provided in an optical path between the second optical system and the projection surface;
wherein a light beam from the deflecting element to the projection surface traverses a light beam from the first optical system to the second optical system; and
wherein the deflecting element is a reflectance controllable element.

3. A projection optical system comprising:
a projection surface configured such that an image conjugate to an object is projected;
plural optical elements having a refractive power; and
a deflecting element having no refractive power configured to deflect an optical path of a light beam and to pass the light beam having a deflected optical path between the plural optical elements; and
wherein a normal line of the projection surface at a center of the projection surface does not pass through the plural optical elements or between the plural optical elements;
wherein the plural optical elements comprise a first optical system having a positive refractive power and configured to form an intermediate image conjugate to the object and a second optical system comprising at least one optical element and configured to form an image conjugate to the intermediate image;
wherein the deflecting element is provided in an optical path between the second optical system and the projection surface;
wherein a light beam from the deflecting element to the projection surface traverses a light beam from the first optical system to the second optical system; and
wherein the deflecting element is a half mirror element.

4. An image displaying apparatus comprising an image generating device configured to generate an image and an image projecting and displaying device configured to project and display an image generated by the image generating device onto or on a display surface, wherein the image projecting and displaying device comprises the projection optical system as claimed in claim 1.

5. An image displaying apparatus comprising an image generating device configured to generate an image and an image projecting and displaying device configured to project and display an image generated by the image generating device onto or on a display surface, wherein the image projecting and displaying device comprises the projection optical system as claimed in claim 2.

6. An image displaying apparatus comprising an image generating device configured to generate an image and an image projecting and displaying device configured to project and display an image generated by the image generating device onto or on a display surface, wherein the image projecting and displaying device comprises the projection optical system as claimed in claim 3.

* * * * *